United States Patent [19]

VonKleist et al.

[11] Patent Number: 4,991,817

[45] Date of Patent: Feb. 12, 1991

[54] CADDY FOR REMOTE CONTROLS

[76] Inventors: Robert D. VonKleist, 63 Maplewood Ave., West Hartford, Conn. 06119; Bruce Fisher, 7 Washington Cir., Unionville, Conn. 06085

[21] Appl. No.: 354,849

[22] Filed: May 22, 1989

[51] Int. Cl.$^5$ ............................................. F16M 13/00
[52] U.S. Cl. .................... 248/676; 206/328; 211/13; 248/205.2; 248/441.1
[58] Field of Search ............ 248/441.1, 637, 639, 248/676, 678, 205.2; 211/13, 26; 455/603, 151, 352; 340/825.72, 825.69; 358/194.1; 206/328, 305

[56] References Cited

U.S. PATENT DOCUMENTS

| 4,044,980 | 8/1977 | Cummins | 248/676 X |
| 4,259,568 | 3/1981 | Dynesen | 248/676 X |
| 4,303,156 | 12/1981 | Vucich | 206/305 |
| 4,424,899 | 1/1984 | Rosenberg | 206/305 |
| 4,544,065 | 10/1985 | Mueller | 211/13 |
| 4,709,412 | 11/1987 | Seymour et al. | 455/352 X |
| 4,712,693 | 12/1987 | Striplin | 211/13 X |

Primary Examiner—David L. Talbott
Attorney, Agent, or Firm—Fishman, Dionne & Cantor

[57] ABSTRACT

A caddy or carrier for holding one or more electronic remote control devices wherein said caddy or carrier comprises a first, high-friction surface disposed at an incline, a second surface spaced from and disposed beneath said first surface and support means for both of said surfaces disposed on each side thereof thereby forming a compartment between said surfaces for holding informational material.

12 Claims, 2 Drawing Sheets

CADDY FOR REMOTE CONTROLS

BACKGROUND OF THE INVENTION

This invention generally relates to an article manufactured for use with electronic entertainment devices. More particularly, it relates to an article of manufacture for holding one or more electronic remote control devices used in controlling VCR's, TV's, CD players, etc.

Over the past few years, the electronic entertainment industry has seen a significant rise in the number of households which have one or more electronic entertainment devices therein. Such devices include televisions, VCR's, stereo receivers, CD players, tape decks, etc. As is well recognized, each of said entertainment devices may be provided with remote control devices for permitting the control of said devices from a point away from the location of the devices. As such is the case, it is not unusual for a single household to have a plurality of said remote control devices.

It is an object of the present invention to provide an article of manufacture which may be used to hold one or more electronic remote control devices.

It is another object of the present invention to provide a caddy or carrier for remote control devices which has a compartment for entertainment information material such as a television and/or radio program guide.

It is another object of the present invention to provide a caddy or carrier for remote control devices wherein the upper surface of said caddy is provided with a high-friction material.

It is a further object of the present invention to provide a caddy or carrier for remote control devices which is durable, yet inexpensive to manufacture.

The above and other objects and advantages of the present invention will be better appreciated and understood from the following detailed description and the accompanying drawings.

BRIEF DESCRIPTION OF THE DRAWINGS

Referring to the drawings, wherein like elements are numbered alike in the several FIGURES.

DESCRIPTION OF THE PREFERRED EMBODIMENTS

Referring to FIGS. 1-4 and 6, the remote control caddy or carrier is shown generally at 10. As depicted, the caddy is comprised of four structural parts, a first or upper surface 12, a second or lower surface 14 and right and left support members, 16 and 18 respectively.

Figure 6:
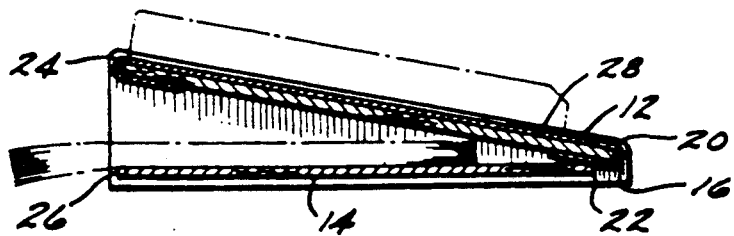
FIG. 6 a section view of taken along the line 6—6 of FIG. 5.

As best seen in FIG. 6, the upper surface 12 is spaced from and positioned directly over the lower surface 14. As further show, the upper surface is positioned at an angle of from about 5° to about 20°, preferably 10° to 15°, relative to the lower surface so that the rear edges thereof, 20 and 22 respectively, are closer together than the front edges 24 and 26. The primary purpose of the inclined nature of the upper surface is to position the remote control devices so as to make them easily viewable and operable.

Figure 1:
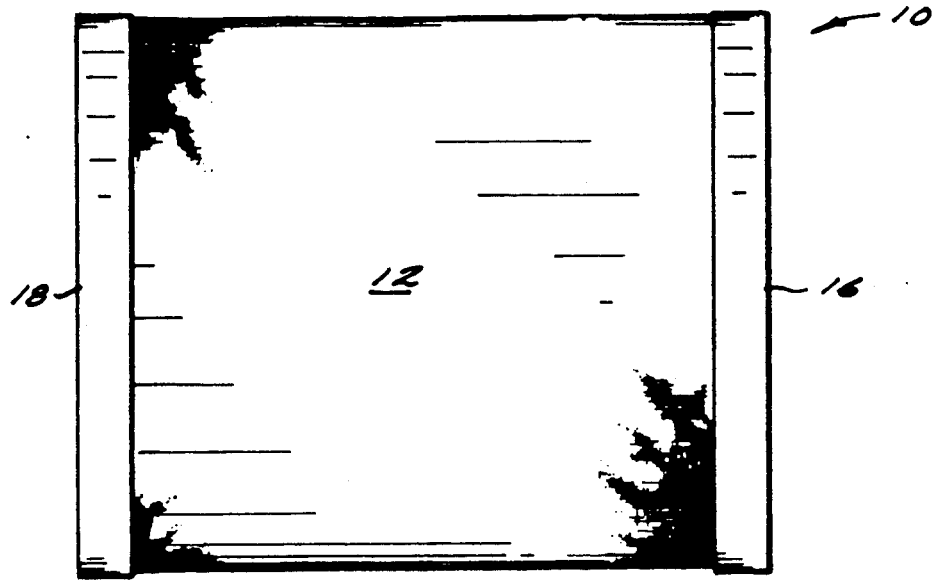
FIG. 1 is a top plan view of the remote control caddy of the present invention.
Figure 2:
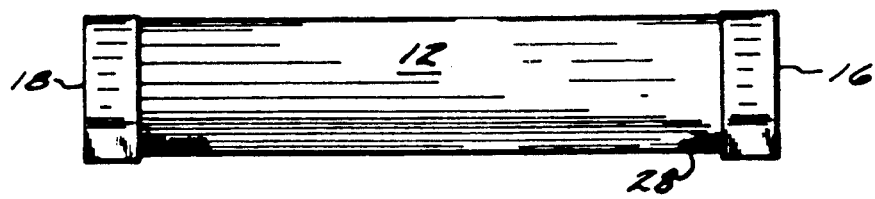
FIG. 2 is a rear elevation view of the remote control caddy shown in FIG. 1.
Figure 3:
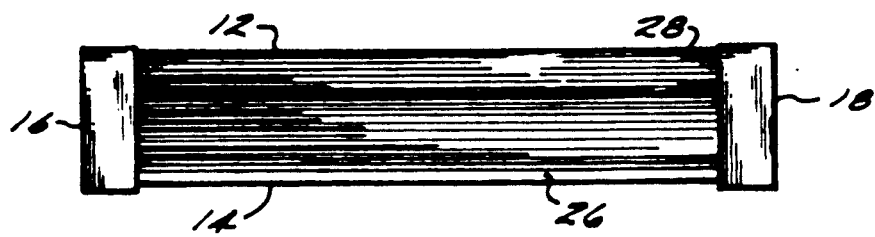
FIG. 3 is a front elevation view of the remote control caddy of FIG. 1.
Figure 4:
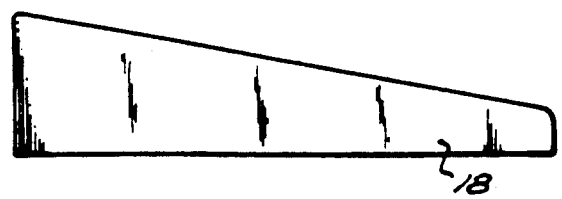
FIG. 4 is a side elevation view of the remote control caddy of FIG. 1.

With reference to FIGS. 2, 3 and 6, it will be noted that the lower surface is disposed slightly above and substantially parallel to the bottom surface of each of the support members 16 and 18, thus minimizing the amount of surface area of the caddy 10 which comes into contact with the surface of a table or the like on which it is placed. The bottom surfaces of said supports 16 and 18 may also be provided with cushion means such as rubber or felt pads (not shown).

As seen in the various FIGURES, the upper surface 12 is at least partially covered with a soft, high-friction material 28 such as felt or the like. Said covering may be provided in strip form (not shown) or the whole of said surface may be covered with said material 28 as shown in the drawings. It is contemplated that said high-friction material 28 may be one half of a "hook and loop" fastener which is sold under the trademark "Velcro". The other half of said "hook and loop" fastener may be applied to the bottom of the various remote control devices used with the caddy 10. The soft, high-friction material aids in maintaining the relative positions of remote control devices placed on the caddy such as is shown in phantom in FIG. 5.

Figure 5:
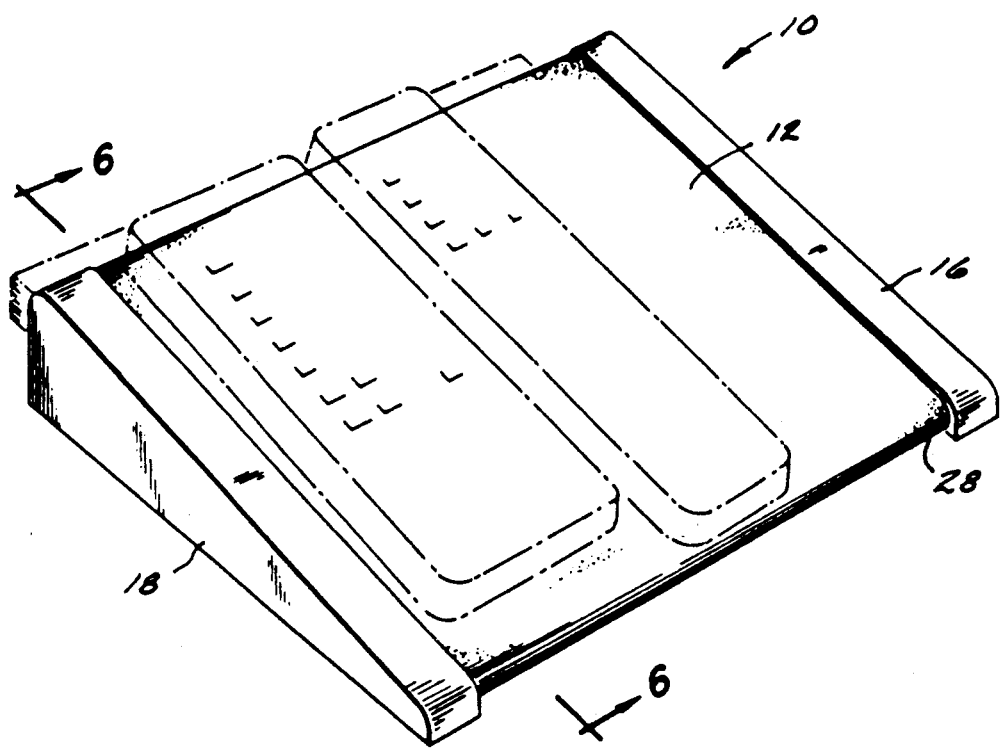
FIG. 5 is a top left perspective view of the remote control caddy of FIG. 1.

As best seen in FIGS. 5 and 6, the relative position of the upper surface 12 and lower surface 14 provides a compartment between them for receiving and holding an entertainment guide such as a TV or radio program guide as shown in phantom in said FIGURES.

The various parts of the caddy 10, i.e. the upper and lower surfaces 12 and 14 respectively and the support members 16 and 18, may be made from a variety of materials such as wood or plastic or a combination thereof, and the caddy may be produced in a number of sizes so as to accommodate any number of electronic remote control devices.

What is claimed is:

1. A remote control caddy for holding one or more electronic remote control devices, comprising:
    a first planar member, said first planar member having a front edge, a rear edge and a pair of opposed side edges;
    a second planar member, said second planar member having a top surface, a front edge, a rear edge and a pair of opposed side edges, disposed above said first planar member and oriented at a nonzero angle relative to said first planar member so that the rear edges of the planar members converge toward each other; and
    a pair of opposed vertical support members, each of said support members being secured to a respective one of each pair of the opposed side edges of the planar members;
    said top surface providing a support for the one or more remote control devices;
    said caddy providing a storage compartment between said planar members and said compartment having a rectilinear opening between the front edges of the planar members.

2. The caddy of claim 1, wherein the nonzero angle is between about 5° and about 20°.

3. The caddy of claim 1, further comprising:

a soft, high friction covering disposed on the top surface of the second planar member.

4. The caddy of claim 3, wherein said covering comprises a first part of a two part hook and loop fastener, and wherein the second part of the two part hook and loop fastener is affixed to the one or more remote control devices.

5. The caddy of claim 1, wherein the vertical support members are each triangularly shaped and each have front, bottom and top edges, wherein the first planar member is oriented substantially parallel to the bottom edges of the support members and the second planar member is oriented substantially parallel to said top edges of the support members and wherein the opening of the storage compartment is defined by the front edge of the planar members and the front edges of the support members.

6. A caddy for holding one or more electronic remote control devices, consisting essentially of:
- a first planar member, said first planar member having a front edge, a rear edge and a pair of opposed side edges;
- a second planar member, said second planar member having a top surface, a front edge, a rear edge and a pair of opposed side edges, disposed above said first planar member and oriented at a nonzero angle relative to said first planar member so that the rear edges of the planar members converge toward each other;
- a pair of opposed vertical support members, each support member being secured to a respective one of each pair of the opposed side edges of the planar members; and
- a soft high friction covering disposed on the top surface of the top surface of the second planar member;
- said top surface providing a support for the one or more remote control devices;
- said caddy providing a storage compartment between said planar members and said compartment having a rectilinear opening between the front edges of the planar members.

7. The caddy of claim 6, wherein the nonzero angle is between about 5° and about 20°.

8. The caddy of claim 7, wherein said covering comprises a first part of a two part hook and loop fastener, and wherein the second part of the two part hook and loop fastener is affixed to the one or more remote control devices.

9. The caddy of claim 8, wherein the vertical support members are each triangularly shaped and each have front, bottom and top edges, wherein the first planar member is oriented substantially parallel to the bottom edges of the support members and the second planar member is oriented substantially parallel to said top edges of the support members and wherein the opening of the storage compartment is defined by the front edge of the planar members and the front edges of the support members.

10. A caddy for holding one or more electronic remote control devices, comprising;
- a pair of opposed spaced apart vertical support members, each of said support members being substantially planar triangularly shaped, each having a horizontal bottom edge extending from a back end to a front end, a top edge extending forwardly upwardly from a back end to a front end at a nonzero angle relative to said bottom edge and a front edge extending between the front end of the bottom edge and the front end of the top edge;
- a first planar member having a front edge, a back edge and a pair of opposed side edges, extending horizontally between said support members substantially parallel to and near bottom edges of said support members and having each of said opposed side edges secured to a respective one of said opposed support members; and
- a second planar member having a top surface, a front edge, a back edge and a pair of opposed side edges, extending between said support members substantially parallel to and near said top edges of said support members, so that said back edges of said planar members converge toward each other, and having each of said opposed side edges secured to a respective one of said opposed support members; said top surface of said second planar member providing a support for the one or more remote control devices, said caddy defining a storage compartment between said planar members said compartment extending from said rear edges of said planar members to said front edges of said planar members and having a rectilinear opening defined by the front edges of the planar members and the front edges of the support members.

11. The caddy of claim 10, wherein the nonzero angle is between about 5° and about 20°.

12. The caddy of claim 10, further comprising:
- a soft, high friction covering disposed on the top surface of the second planar member.

* * * * *